United States
McKinley 3,711,185
Jan. 16, 1973

[54] CATADIOPTRIC TELESCOPE

[76] Inventor: Harry R. McKinley, Rattle Hill Road, Southampton, Mass. 01073

[22] Filed: May 3, 1971

[21] Appl. No.: 139,839

Related U.S. Application Data

[63] Continuation-in-part of Ser. No. 11,195, Feb. 13, 1970, abandoned.

[52] U.S. Cl..................................................350/201
[51] Int. Cl.............................................G02b 17/08
[58] Field of Search.......................350/199, 200, 201

[56] References Cited

UNITED STATES PATENTS

| | | | |
|---|---|---|---|
| 3,527,526 | 9/1970 | Silvertooth | 350/201 X |
| 2,608,129 | 8/1952 | Taylor | 350/199 |
| 3,119,892 | 1/1964 | Shenker | 350/199 |

*Primary Examiner*—John K. Corbin
*Attorney*—Robert Ames Norton et al.

[57] ABSTRACT

A fixed optics telescope is described with two meniscus shaped lenses fixed at the ends of the telescope body. The lenses have spherical surfaces of long radius of curvature. The first meniscus at the end of the telescope which is struck by light rays has a small part of the center formed into a mirror by silvering, aluminizing, and the like. The rear or convex surface of the meniscus at the other end of the telescope housing is formed into an annular mirror with a clear central portion. All surfaces are spherically ground and preferably have identical radii of curvature. The system is catadioptric, entering rays are preferably refracted by four passages through the lenses which corrects spherical aberration in the mirrors, which in this preferred form are second surface mirrors.

6 Claims, 2 Drawing Figures

INVENTOR.
HARRY R. MCKINLEY

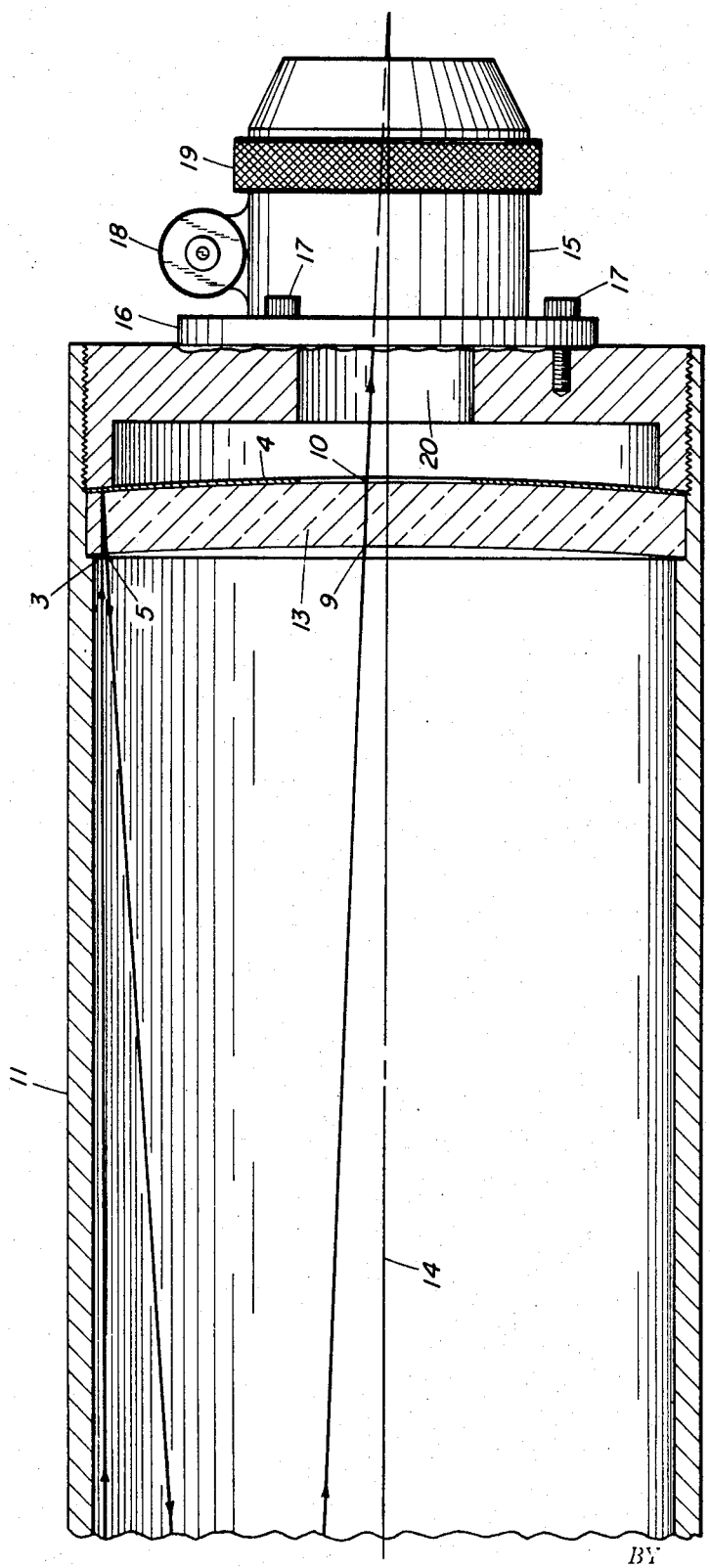

CATADIOPTRIC TELESCOPE

RELATED APPLICATION

This application is a continuation-in-part of my prior application, Ser. No. 11,195, filed Feb. 13, 1970 now abandoned.

BACKGROUND OF THE INVENTION

Cassegrain telescopes are well known types but either require aspheric mirrors or a dioptric correction for spherical aberration of a type which is often referred to as a Maksutov modification. The mirrors are first surface mirrors, and if they are spherical with refractive correction for spherical aberrations, the dioptric correcting element requires relatively high optical power and is in the form of lens element in which the radii of curvature of the two surfaces are not the same. In recent years an extremely ingenious and very successful type of the catadioptric telescope above referred to has been sold under the trade name "Questar." In this device focusing is effected by moving the main reflective elements. The mechanical as opposed to the optical design of this telescope has required extremely accurate mechanical movements. The workmanship of these movements is so extraordinarily good that the telescopes have achieved very wide practical success. However, the cost of the extreme precision mechanical movements of the mirrors is very high, and of course, in spite of the extraordinary quality of the precision mechanical movements, any movement of relatively large mirrors introduces eventually the possibility of wear and inaccuracy, and there still is a need for a simpler catadioptric telescope which can be produced more economically. It is with such an instrument that the present invention deals.

A catadioptric objective has been proposed, as described in the U.S. Pat. No. to Silvertooth, 3,527,576, Sept. 8, 1970, with particular reference to FIG. 8, which is the closest to the system of the present invention. In this figure there are two meniscus lenses with their concave sides toward the front of the system. On the concave side of the first meniscus there is a central aluminized surface, and on the convex side of the second mirror there is an annular aluminized surface. In addition there are two annular mirrors, which are first order mirrors, one on the convex side of the first meniscus and the other nearer the center on the concave side of the second meniscus. Through this latter there is a physical hole in the center in which is mounted an eyepiece or other lens. The light passing through the clear annular part of the first meniscus goes through the outer clear portion of the second meniscus, is reflected by the annular mirror on its rear, strikes one of the annular mirrors which is on the convex side of the first meniscus, is reflected back to an annular mirror on the concave side of the second meniscus arranged nearer the center, and then is reflected back to the mirror on the concave side of the first meniscus, and finally passes through the latter and through the lens in the central opening of the second meniscus. In other words, there are required four reflecting surfaces and the back focal length is very short. This is a reason why the final lens elements have to be mounted in a hole in the second meniscus. The Silvertooth system, while operative and very compact, requires a large number of reflections and a large number of mirror surfaces.

SUMMARY OF THE INVENTION

The present invention utilizes in an ordinary telescope barrel or housing two fixed meniscus lenses, focusing being effected by a conventional focusing device which varies the position of a telescope eyepiece or, in the case of a camera adapter, the focusing of the camera, i.e., the distance to the photographic surface. Such focusing is well known, and simple and excellent devices are available on the open market. Of course such focusing devices are attached to the back of the telescope and form a rigid connection. As this type of focusing is well known and is not changed in its mechanical design by the present invention, the particular design of the focusing mechanism forms no part of the present invention. A common type will be illustrated diagrammatically below in the description of the preferred embodiment. This is illustrative only and, of course, does not limit the invention. It is, however, an advantage that conventional and reliable focusing mechanisms may be used in the present invention without change of design. This is an advantage and makes the present invention extremely flexible for astronomical, terrestrial or photographic purposes.

Since the catadioptric elements in the telescope body proper are fixed, they can be made much cheaper and require no elaborate precision mechanical movements. Of course since they are fixed, the possibility of wear in such movements is completely eliminated.

The present invention produces an improved result with half the number of reflecting surfaces used in Silvertooth and constitutes a system with long back focal length, which makes it possible to make the rear meniscus of Silvertooth in one piece of glass without a physical hole in the middle in which the eyepiece or other focusing mechanism is mounted. The great difficulty of producing a rugged, reliable system when it is necessary to provide focusing optics mounted in a hole in one of the lenses is completely avoided. In other words, not only have the number of mirror surfaces been reduced by half but the final result is an improved and more reliable optical system. The system as a whole eliminates half of the reflecting elements but as a system does not eliminate their function and, on the contrary, produces a better and more rugged device.

In the present invention two meniscus lenses are used as in Silvertooth, but there are only half as many reflecting surfaces, one on each of the meniscus lenses. It is also not necessary to mount focusing optics in a physical hole in the rear meniscus lens, and even if the central portion of the rear meniscus lens were in the form of a physical hole the system would still have the advantages of long back focal length and much more reliable and rugged mounting of focusing elements which the long back focal length permits.

There are two general modifications of the present invention, but both involve the same number of reflective paths. They have advantages and disadvantages. In the first modification, which is preferred, a central mirrored surface is formed on the concave side of the first meniscus and an annular surface on the convex side of the rear meniscus. In other words, both mirrors are second surface mirrors and the light passes through the clear outer annulus of the first meniscus through the second meniscus, is reflected, again passes through the second meniscus and through the first meniscus, and finally, after reflection from the central mirror of the first meniscus, on out through the clear portion of the second meniscus. This very large number of passages through the dioptric element of the meniscus lenses, one more than in Silvertooth, produces the most perfect possible correction for spherical aberration with extremely low powered optics as the surface radius of curvature of the meniscus surfaces is very long as compared to much greater curvature of correcting dioptric elements used in the conventional Maksutov system. In the preferred modification the most perfect possible correction for spherical aberration is achieved. However, as in many optical instruments this approach to perfection of correction carries a price, and that is, stray reflections from the concave surface of the rear meniscus and the convex side of the front meniscus. Under certain circumstances in use this can give rise to so-called ghosts. The near perfection of the correction for spherical aberration of the catoptric portion of the instrument can be retained and ghosts eliminated by using conventional anti-reflection coatings on the surfaces of the meniscus lenses which are not aluminized. While anti-reflection coatings are well known, their application to the partially aluminized meniscus lenses involves an additional operation with a substantial, though by no mean prohibitive, cost.

A second modification which gives less perfect correction for spherical aberration replaces the second surface mirrors on the two meniscus lenses with first surface mirrors, i.e., on the central portion of the convex face of the first meniscus and the annular portion of the concave face of the second meniscus. No ghosts result and no anti-reflection coating is needed, though of course if desired it can be applied to the clear annular portion of the first meniscus. However, its only function there would be to increase slightly the amount of light in the system. For many telescope operations the absolute maximum of spherical correction is not needed, and in such cases very substantial additional cost savings are available. Nevertheless, where the maximum approach to optical perfection is desirable, the second surface mirrors are somewhat preferred.

Regardless of which modification is used, the very serious obscuration which is present in the Silvertooth system is avoided and, as has been pointed out above, the long back focal length made possible by either modification permits simpler and more reliable focusing optics.

The preferred modification will first be described and is the one which will be described in a later section in connection with the drawings showing the preferred embodiment, and the small changes to provide the other modification with first surface mirrors will then be briefly described, although to a skilled optical designer they might be considered self-evident.

The first meniscus, at the entrance aperture of the telescope, has a central portion of its concave surface made into a mirror by aluminizing, silvering, or any other conventional process. The rear meniscus element has a large annular mirror surface developed on its rear or convex surface, leaving a central portion of suitable size which is transparent. This may be considered as having some analogy to the conventional hole in the center of a Cassegrain primary mirror. However, for reasons that have been stated and will be brought out below, this is not a physical hole but clear glass or other material transparent to the radiations for which the telescope may be used.

A brief generalized description of a light path through the telescope will make the features which will be described in more detail below clear. Optical radiation, by which is meant radiation of a sufficiently short wavelength so that it obeys the laws of geometrical optics and which includes not only visible light but infrared and ultraviolet, passes through the annular clear portion of the first meniscus. Refraction takes place at the concave and convex surfaces. The rays then pass through the concave surface of the rear meniscus, and are reflected by the annular second surface spherical mirror on the rear or convex surface of the second meniscus. They pass again through the meniscus, back to the convex surface of the front meniscus, through it, and strike the central second surface mirror, where they are reflected, again pass through the meniscus and on through the clear central position of the rear meniscus, of the telescope, and through a focusing mechanism to an eyepiece or camera. It will be noted that there are four passages through the two lenses. This is made possible by the second surface mirrors. Because refractive corrections of the spherical aberrations of the two mirrors are divided the lenses can be of lower power than if one or two passages only through refractive elements are present, which is the case with the ordinary Maksutov modification of a Cassegrain telescope. Such a modified system requires much higher optical powers of the lenses and, which is of importance in the preferred modification of the present invention, the two surfaces of each lens are not of the same curvature. When two to four times as many passages through the refracting elements are present, as is made possible by the present invention, the lenses can be of much lower power because the spherical aberration corrections are distributed over a larger number of passages. It is also possible, and this is the preferred form for both modifications, to have both meniscus lenses with spherical surfaces of identical radius of curvature. This with the comparative long radius of curvature and low optical power decreases the cost of the meniscus blanks very greatly and they can be ground economically and reliably on standard grinding machines.

With either first or second surface mirrors the present invention has a very long back focal length, does not require special, complicated, and relatively fragile focusing of the lens in the hole of the second Silvertooth meniscus. While it is advantageous to have the second meniscus in a single solid piece with no central hole, it should be noted that if for some reason someone desired to have a physical hole instead of a clear portion, which might be thought of as an optical hole, this still retains the relatively long back focal length of the present system and internal mounting of focusing optics is not required as it is in Silvertooth.

Forming the mirror surface is by conventional means, such as vacuum deposition of aluminum or other metals through suitable masks, and the second surface mirrors of the present invention are no more expensive to produce than first surface mirrors which have been used before. Since the surfaces of the mirrors, which are not in contact with the lenses, perform no optical function, they can be protected by coatings, preferably black coatings, to avoid reflections in the telescope. Of course the inside of the telescope tube is black in the conventional manner.

The performance of the system is excellent, being diffraction limited for a considerable range of apertures up to six inches in diameter. This provides for as perfect resolution as can be obtained optically.

Another advantage of the optical design of the present invention, particularly when the two meniscus lenses have surfaces of the same radius of curvature, is that a relatively large field of view is possible with excellent correction. For example, a 4-inch telescope with a focal length in excess of 40 inches will fill a 35 mm photographic frame, (25 × 36 mm), which is substantially larger than normal in astronomy. It is also highly desirable when the telescope is to be used for terrestrial purposes and as an extreme telephoto objective for 35 mm photography.

The advantages of fixed optics, greatly reduced cost of manufacture, which can be less than half that of a telescope of comparable aperture where the elements are movable for focusing purposes, are obtained without loss of other desirable characteristics. The extreme resolution, diffraction limitation even with a 6-inch aperture, is obtained with a relatively high speed. For example, with a 4-inch aperture instrument and a focal length of approximately 45 inches, a speed of around $f/11.2$ is achieved as opposed to about $f/14$ for the same size aperture with an instrument having movable elements. The fact that the telescopes of the present invention present many advantages without offsetting disadvantages is an unusual situation, as generally when one characteristic is to be improved others suffer and the net result has to be a compromise. While the extreme delicacy and precision of mechanical movement with movable elements is not necessary, it should be realized that the present invention is, after all, a precision instrument, and so, customary care in mounting the optical elements should be used.

The present invention is of particular interest for use primarily in the visible light range, and this is true whether the telescope is used for astronomical, terrestrial or photographic purposes. However, it is possible to use the design of the present invention for either infrared or ultraviolet, requiring of course the use of suitable materials for the lenses which are transparent for the bands of radiation employed. The nature of the second surface mirror should also be chosen to be suitable with the radiation used. For example, with optics extending beyond the very near infrared, gold mirrors are somewhat more efficient reflectors than aluminum mirrors, which are more common for visible light, and of course the proper material should be used for the radiation bands in which the telescope is to be used. When the instrument is to be used only in the further infrared, it is even possible to use optics such as those made of germanium or silicon, though in such cases the telescope cannot be used for visible light. The enormous refractive index of these semiconductors, 4.0 for germanium, of course makes it possible to have thinner elements. However, in the large sizes, such as 4 to 6 inches, the cost of germanium and silicon may be very high and so some other materials, such as the Irtran glasses, may be preferred. These materials are also transparent in the visible light and so permit a telescope of multiple radiation characteristics. In the case of ultraviolet, quartz optics or in some cases optics of ammonium dihydrogen phosphate may be employed. The wide usage with various optical radiations are particularly significant because there is no moving of the main optical elements and all focusing is with eyepieces, photographic surface location, and the like. This is an additional advantage.

Because the optical elements are fixed in the telescope housing, it is possible to provide them with threadable or other mountings so that in some special cases optics of different elements may be provided for the same housing. This is, of course, a practical impossibility where the elements have to be moved with the extreme mechanical precision which has been mentioned above. For the vast majority of practical uses a single range of radiation will come into question, and so in such cases the possibility of interchangeable optics for different optical radiations is often not needed, which permits still further economies in telescope construction.

If the modification using first surface mirrors is used, of course the physical location of the mirror surfaces is slightly changed by the thickness of the meniscus lenses, since the central mirror on the first meniscus lens is on its inner or convex side and the annular mirror on the second meniscus is on its concave side. For a given separation of the two meniscus lenses the optical path is reduced by twice the thickness of the lens and, as should be self-evident to the skilled optical designer, this requires a slightly different spacing of the two elements to retain optical performance.

The preferred modification referred to above has both mirrors second surface mirrors, and the other modification, which sacrifices some perfection for substantial cost economies, has two first surface mirrors. It is, of course, possible to have one of the mirrors second surface and the other first surface and such a combination is not excluded, but ordinarily either one modification with all second surface mirrors or with all first surface mirrors would be chosen.

In the most common uses, such as for astronomy, the term "telescope" is ordinarily used and that is employed in the present application. However, it should be realized that in effect the telescope of the present invention is really an extremely long focus, high resolution objective, and for certain photographic purposes the term "telescope" is not in as common use. In the present application the terms "telescope" and "objective" are used to mean substantially the same thing.

BRIEF DESCRIPTION OF THE DRAWINGS

FIGS. 1A and 1B show partly in elevation but mostly broken away in section, a telescope according to the present invention. Accessories, such as tripod mounting means and the like, are not shown on the telescope housing as they are not changed by the present invention and would only confuse the drawings, which is this respect may be considered as semi-diagrammatic.

BRIEF DESCRIPTION OF THE PREFERRED EMBODIMENTS

Figure 1A:
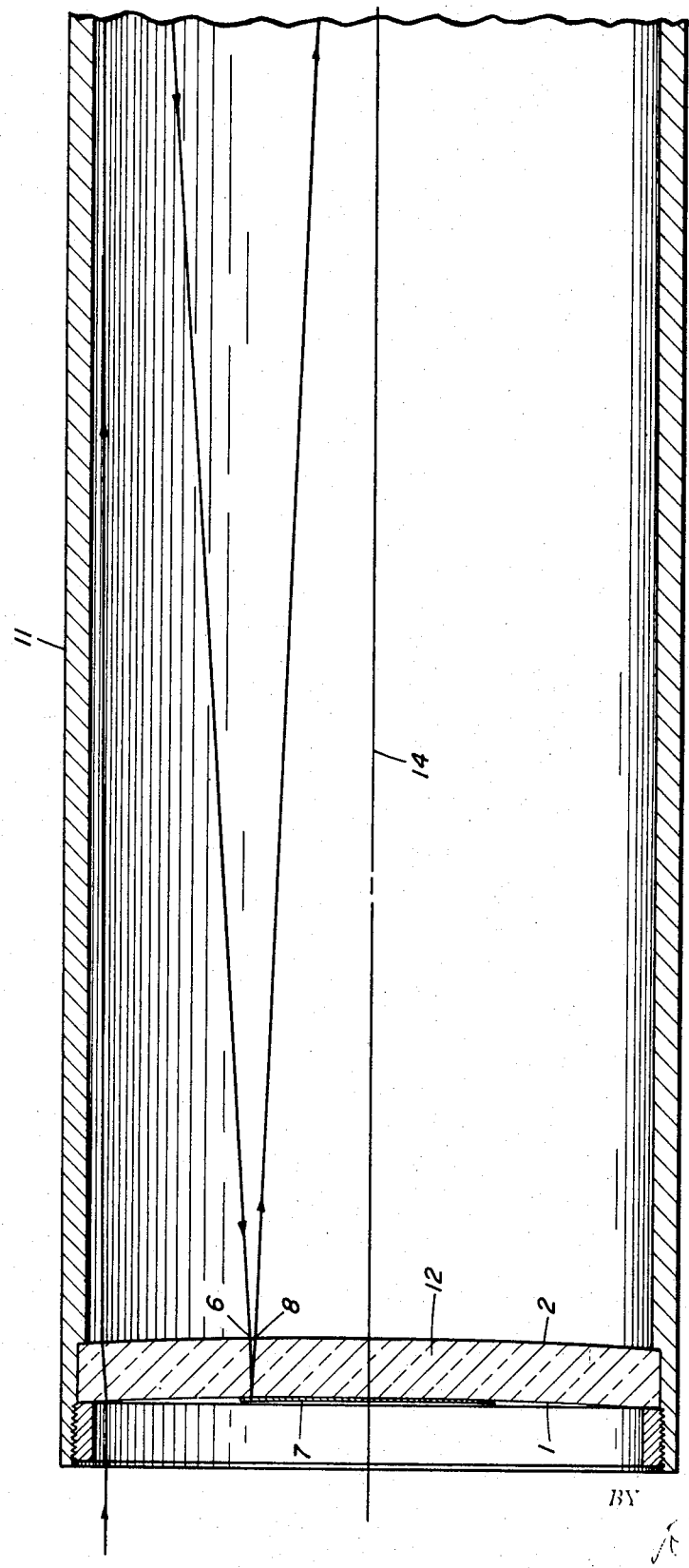

In the drawings the telescope housing or barrel is shown at (11), with a front meniscus lens (12) and a rear meniscus lens (13). The optical axis of the telescope is at (14) and only a single ray is traced in order not to confuse the drawing. The telescope is shown broken away in the middle in the two figures in order to maintain an adequately large scale. In fact the drawings are substantially full scale for a 4 inch instrument. The two meniscus lenses are firmly and rigidly mounted in the barrel, but such well known elements as gaskets and the like are not shown in order not to confuse the drawing. In order to describe ray passage the various surfaces of the different parts of the meniscus lenses are given separate numbers.

Tracing the ray, it first strikes surface (1) of the annular clear portion of lens (12), (FIG. 1A), passes through it and out the convex surface (2), being refracted, but not very sharply because of the low power of the lenses, which will be brought out quantitatively below in a typical illustration. The ray then strikes concave surface (3) of the meniscus (13), (FIG. 1B), passes through it with refraction, and strikes an annular mirror surface (4) on the back, which is a second surface mirror. Reflection takes place, the ray passing again through the lens (13), and leaving surface (5) strikes surface (6) of lens (12), passes therethrough and is reflected from the central second surface mirror (7), again passing through the lens, emerging through the surface (8), and finally passing through the clear central portion of the lens (13) with its two surfaces (9) and (10).

On the back of the housing (FIG. 1B), there is bolted a conventional focusing means. This is shown in the main in elevation, the flange (16) bolted to the rear of the telescope housing with bolts (17). The focusing mechanism (15) is provided with a focusing knob (18), the shaft of which turns a pinion cooperating with a rack for coarse focusing. As this portion of the focusing mechanism is in elevation, the rack and pinion are not shown and of course are not changed by the present invention. Fine focusing is provided by a collar (19) which is threaded onto a fine internal screw, (not shown), to provide fine focusing. It will be seen that the front portion of the focusing device, which is broken away, has an opening (20) which is of the size for conventional eyepieces or camera adapters. These can be slid in the rear, but are not specifically shown as, again, they are not changed by the present invention. Different kinds of eyepieces may be provided, such as astronomical eyepieces, erecting terrestrial eyepieces, right-angled eyepieces for astronomical observation, and miniature camera adapters. All of these and other attachments are of standard design and fit into the typical, conventional focusing means shown in the drawing.

The following table gives the optical characteristics of the elements, both the radius of curvature of the various surfaces and the distance to the next surface. All dimensions are in inches and the type of the surface is designated "Refr" for refractive surfaces and "Refl" for reflective surfaces.

| Surf No. | Type | Radius | Distance to Next Surface | Refract. index | Disp. V |
|---|---|---|---|---|---|
| 1 | Refr | −53.56 | 0.45 | 1.517 | 64.5 |
| 2 | Refr | −53.56 | 15.0 | 1.0 | air |
| 3 | Refr | −53.56 | 0.45 | 1.517 | 64.5 |
| 4 | Refl | −53.56 | −0.45 | −1.517 | 64.5 |
| 5 | Refr | −53.56 | −15.0 | −1.0 | air |
| 6 | Refr | −53.56 | −0.45 | −1.517 | 64.5 |
| 7 | Refl | −53.56 | 0.45 | 1.517 | 64.5 |
| 8 | Refr | −53.56 | 15.0 | 1.0 | air |
| 9 | Refr | −53.56 | 0.45 | 1.517 | 64.5 |
| 10 | Refr | −53.56 | 2.92 (Back Focal Length) | 1.0 | air |

It will be noted that the distance from surface (10) to the next surface is given although this surface, which is an eyepiece surface or film in a camera, is not shown. The dimension, of course, as indicated, constitutes the back focal length of the telescope.

The diameter of the two meniscus lenses, which constitutes the aperture of the telescope, is 4.0 inches, the total focal length is 44.8 inches, and the speed is f/11.2. It will be seen that all surfaces of both meniscus lenses have the identical radius of curvature, which is the preferred form of the present invention and which, as has been pointed out above, permits maximum savings in manufacturing cost.

Reference has been made to anti-reflection coatings where complete freedom from ghosts is needed. Such anti-reflection coating can be applied to the surface (2) of the first meniscus and to the clear portion of the surfaces (9) and (10) of the second meniscus. The drawings do not show the anti-reflection coatings as they are conventional and would only confuse the drawings.

When first order mirrors are used, of course the rays striking at (3) and (5) in FIG. 1B and at (6) and (8) in FIG. 1A constitutes the same point as this is the surface of the first surface mirror.

I claim:

1. A telescope objective comprising a telescope barrel or housing, a fixed front meniscus lens and a fixed rear meniscus lens, both lenses having identical radii of curvature, both lenses of low optical power, the front lens having an annular clear portion and a single small center mirrored portion and the rear meniscus having a single annular mirror surface, the center of the meniscus being clear, all surfaces of both meniscus lenses being spherical and the power of the lenses and spacing correcting the spherical aberrations of the two mirror surfaces, whereby the objective is of a corrected Cassegrain type, the position of the meniscus lenses in the objective providing a back focal length of the order of one-fifteenth of the total focal length and sufficient to permit mounting of a conventional camera adapter.

2. A telescope objective according to claim 1 in which both mirrored portions are second surface mirrors, the center mirror being on the concave side of the front meniscus lens and the annular mirror surface being on the convex side of the rear meniscus.

3. A telescope objective according to claim 2 in which all surfaces of both meniscus lenses are of identical radius of curvature.

4. A telescope objective according to claim 3 in which the objective aperture and lens diameters are not substantially in excess of 6 inches and the correction for spherical aberration produces a diffraction limited system.

5. A telescope objective according to claim 1 in which all surfaces of both meniscus lenses are of identical radius of curvature.

6. A telescope objective according to claim 3 in which the objective aperture and lens diameters are not substantially in excess of 6 inches and the correction for spherical aberration produces a diffraction limited system.

* * * * *